(12) United States Patent
Zhang et al.

(10) Patent No.: US 11,784,494 B2
(45) Date of Patent: Oct. 10, 2023

(54) DIRECT CURRENT POWER SUPPLY SYSTEM, PHOTOVOLTAIC SYSTEM, ENERGY STORAGE SYSTEM, AND OPTICAL STORAGE SYSTEM

(71) Applicant: Huawei Digital Power Technologies Co., Ltd., Shenzhen (CN)

(72) Inventors: Xiufeng Zhang, Dongguan (CN); Yanzhong Zhang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/709,059

(22) Filed: Mar. 30, 2022

(65) Prior Publication Data

US 2022/0320870 A1 Oct. 6, 2022

(30) Foreign Application Priority Data

Mar. 30, 2021 (CN) .......................... 202120651820.2

(51) Int. Cl.
*H02J 3/38* (2006.01)
(52) U.S. Cl.
CPC ........... *H02J 3/381* (2013.01); *H02J 2300/24* (2020.01)
(58) Field of Classification Search
CPC .. H02J 3/381; H02J 3/382; H02J 3/383; H02J 2300/24

(Continued)

(56) References Cited

U.S. PATENT DOCUMENTS

| 2012/0212052 A1 | 8/2012 | Cyuzawa |
| 2016/0380445 A1* | 12/2016 | He ........................ H02J 15/007 320/107 |

(Continued)

FOREIGN PATENT DOCUMENTS

CN 108649594 A 10/2018

*Primary Examiner* — Hal Kaplan
(74) *Attorney, Agent, or Firm* — Leydig, Voit & Mayer, Ltd.

(57) ABSTRACT

A direct current power supply system includes N power supply devices, N triple-pole direct current switches, a positive bus, an M bus, and a negative bus. A positive input terminal of an $i^{th}$ triple-pole direct current switch is coupled to a first output terminal of an $i^{th}$ power supply device, an M input terminal of the $i^{th}$ triple-pole direct current switch is coupled to a second output terminal of the $i^{th}$ power supply device, a negative input terminal of the $i^{th}$ triple-pole direct current switch is coupled to a third output terminal of the $i^{th}$ power supply device, a positive output terminal of the $i^{th}$ triple-pole direct current switch is coupled to the positive bus, an M input terminal of the $i^{th}$ triple-pole direct current switch is coupled to the M bus, and a negative output terminal of the $i^{th}$ triple-pole direct current switch is coupled to the negative bus.

16 Claims, 9 Drawing Sheets

(58) Field of Classification Search
USPC .......................................................... 307/52
See application file for complete search history.

(56) References Cited

U.S. PATENT DOCUMENTS

2017/0141561 A1     5/2017   Morita
2018/0316193 A1    11/2018   Urry et al.

* cited by examiner

DIRECT CURRENT POWER SUPPLY SYSTEM, PHOTOVOLTAIC SYSTEM, ENERGY STORAGE SYSTEM, AND OPTICAL STORAGE SYSTEM

CROSS-REFERENCE TO RELATED APPLICATION

This application claims priority to Chinese Patent Application No. 202120651820.2, filed on Mar. 30, 2021, which is hereby incorporated by reference in its entirety.

TECHNICAL FIELD

Embodiments of this application relate to the field of electronic circuit technologies, and in particular, to a direct current power supply system, a photovoltaic system, an energy storage system, and an optical storage system.

BACKGROUND

A direct current power supply system is configured to provide a direct current. When the direct current power supply system (such as a direct current isolate terra (IT) system and a direct current terra neutral (TN) system) has three wires, namely, a positive wire, a negative wire, and an N wire for feeding out, two double-pole direct current switches are required to protect and isolate one power supply device. However, because volumes of the two double-pole direct current switches are large, a size of the direct current power supply system is large.

SUMMARY

Embodiments of this application disclose a direct current power supply system, a photovoltaic system, an energy storage system, and an optical storage system, to reduce a size of the direct current power supply system.

According to a first aspect, a direct current power supply system is disclosed, and includes N power supply devices, N triple-pole direct current switches, a positive bus, an M bus, and a negative bus, where N is an integer greater than or equal to 1. A positive input terminal of an $i^{th}$ triple-pole direct current switch is coupled to a first output terminal of an $i^{th}$ power supply device, an M input terminal of the $i^{th}$ triple-pole direct current switch is coupled to a second output terminal of the $i^{th}$ power supply device, a negative input terminal of the $i^{th}$ triple-pole direct current switch is coupled to a third output terminal of the $i^{th}$ power supply device, a positive output terminal of the $i^{th}$ triple-pole direct current switch is coupled to the positive bus, an M input terminal of the $i^{th}$ triple-pole direct current switch is coupled to the M bus, and a negative output terminal of the $i^{th}$ triple-pole direct current switch is coupled to the negative bus, where i=1, 2, ..., N. The $i^{th}$ power supply device is configured to provide a direct current.

In the direct current power supply system disclosed in this embodiment of this application, when the triple-pole direct current switch detects that a current flowing through the triple-pole direct current switch is greater than or equal to an overcurrent setting value, the triple-pole direct current switch is disconnected, so that overcurrent protection and overcurrent isolation can be implemented for the power supply device and a cable. A size of one triple-pole direct current switch is smaller than a size of two double-pole direct current switches. Therefore, a size of a direct current switch is reduced, and a size of the direct current power supply system can be further reduced. In addition, because costs of the direct current switch are related to a cross-sectional area of the direct current switch, and a larger cross-sectional area of the direct current switch leads to lower costs of the direct current switch, the costs of the direct current switch can be reduced if two double-pole direct current switches are replaced with one triple-pole direct current switch, and therefore, costs of the direct current power supply system can be reduced. In addition, the power supply device can be maintained only by disconnecting one triple-pole direct current switch, so that maintenance and operation of a user can be facilitated.

In a possible implementation, the $i^{th}$ power supply device includes a $(2i-1)^{th}$ power supply apparatus and a $(2i)^{th}$ power supply apparatus. A first output terminal of the $(2i-1)^{th}$ power supply apparatus is coupled to the positive input terminal of the $i^{th}$ triple-pole direct current switch, a second output terminal of the $(2i-1)^{th}$ power supply apparatus is separately coupled to the M input terminal of the $i^{th}$ triple-pole direct current switch and a first output terminal of the $(2i)^{th}$ power supply apparatus, and a second output terminal of the $(2i)^{th}$ power supply apparatus is coupled to the negative input terminal of the $i^{th}$ triple-pole direct current switch.

In the direct current power supply system disclosed in this embodiment of this application, a combination of a positive electrode and an M-electrode of the $i^{th}$ triple-pole direct current switch can implement overcurrent protection and isolation for the $(2i-1)^{th}$ power supply apparatus and a circuit of the $(2i-1)^{th}$ power supply apparatus; a combination of a negative electrode and the M-electrode of the $i^{th}$ triple-pole direct current switch can implement overcurrent protection and isolation for the $(2i)^{th}$ power supply apparatus and a circuit of the $(2i)^{th}$ power supply apparatus; and a combination of the positive electrode and the negative electrode of the $i^{th}$ triple-pole direct current switch can implement overcurrent protection and isolation for the $(2i-1)^{th}$ power supply apparatus, the $(2i)^{th}$ power supply apparatus, and circuits of the $(2i-1)^{th}$ power supply apparatus and the $(2i)^{th}$ power supply apparatus. It can be learned that, regardless of whether there is a fault caused by the positive electrode to the M-electrode, a fault caused by the M-electrode to the negative electrode, or a fault caused by the positive electrode to the negative electrode, the positive electrode, the M-electrode, and the negative electrode of the triple-pole direct current switch can be disconnected, so that protection and isolation for all faults can be implemented, to improve protection reliability. In addition, because the M-electrode of the triple-pole direct current switch is between the positive electrode and the negative electrode, a cross section of the M-electrode is less than an area of the positive electrode and an area of the negative electrode, so that the costs of the direct current power supply system can be further reduced. In addition, because a cross-sectional area of the M-electrode is less than a cross-sectional area of the positive electrode and a cross-sectional area of the negative electrode, a rated protection current of the M-electrode is less than a rated protection current of the positive electrode and a rated protection current of the negative electrode, and a cable connected to the M-electrode may be relatively small, so that the costs of the direct current power supply system can be further reduced.

In a possible implementation, the $(2i-1)^{th}$ power supply apparatus and the $(2i)^{th}$ power supply apparatus are direct current power supplies or power conversion apparatuses.

In a possible implementation, the direct current power supply system further includes a first component. One end of the first component is coupled to the positive bus, and the other end of the first component is separately coupled to the M bus and the negative bus.

In a possible implementation, the direct current power supply system further includes a second component. One end of the second component is coupled to the negative bus, and the other end of the second component is separately coupled to the M bus and the other end of the first component.

In a possible implementation, the direct current power supply system further includes a first component. One end of the first component is coupled to the negative bus, and the other end of the first component is separately coupled to the M bus and the positive bus.

In a possible implementation, the direct current power supply system further includes a second component. One end of the second component is coupled to the positive bus, and the other end of the second component is separately coupled to the M bus and the other end of the first component.

In a possible implementation, the first component and the second component are loads, power conversion apparatuses, or storage apparatuses.

In a possible implementation, electric potential of the M bus is between electric potential of the positive bus and electric potential of the negative bus.

In a possible implementation, an overcurrent setting value of the M-electrode of the triple-pole direct current switch is less than an overcurrent setting value of the positive electrode of the triple-pole direct current switch and an overcurrent setting value of the negative electrode.

Because the overcurrent setting value of the M-electrode of the triple-pole direct current switch is less than the overcurrent setting value of the positive electrode of the triple-pole direct current switch and the overcurrent setting value of the negative electrode, a cable corresponding to the M-electrode of the triple-pole direct current switch may be smaller than a cable corresponding to the positive electrode or the negative electrode, so that costs can be further reduced.

According to a second aspect, a photovoltaic system is disclosed, and includes N photovoltaic devices, M inverters, a transformer, and the direct current power supply system disclosed in the first aspect or any possible implementation of the first aspect, where M is an integer greater than or equal to 1. The N photovoltaic devices are separately coupled to the direct current power supply system, and the M inverters are separately coupled to the direct current power supply system and the transformer. The photovoltaic device is configured to provide a first direct current for the direct current power supply system. The direct current power supply system is configured to convert the first direct current into a second direct current. The inverter is configured to convert the second direct current into a first alternating current. The transformer is configured to convert the first alternating current into a second alternating current.

In a possible implementation, the photovoltaic system further includes M alternating current switches, and two terminals of a $j^{th}$ alternating current switch are separately coupled to a $j^{th}$ inverter and the transformer, where $j=1, 2, \ldots, M$.

In a possible implementation, an $i^{th}$ photovoltaic device includes one or more photovoltaic strings, and the one or more photovoltaic strings are separately coupled to an $i^{th}$ power supply device in the direct current power supply system.

According to a third aspect, an energy storage system is disclosed, and includes at least the direct current power supply system disclosed in the first aspect or any possible implementation of the first aspect.

According to a fourth aspect, an optical storage system is disclosed, and includes at least the direct current power supply system disclosed in the first aspect or any possible implementation of the first aspect.

DESCRIPTION OF EMBODIMENTS

Embodiments of this application disclose a direct current power supply system, a photovoltaic system, an energy storage system, and an optical storage system, to reduce a size of the direct current power supply system. The following describes embodiments of this application with reference to the accompanying drawings in embodiments of this application.

Terms "first", "second", "third", "fourth", and the like in the specifications, claims, and accompanying drawings in this application are used to differentiate different objects, and are not used to describe a specific order. In addition, the term "include" and any variation thereof are intended to cover non-exclusive inclusion. For example, a process including a series of modules is not limited to listed steps or modules, but optionally further includes a module that is not listed, or optionally further includes another module inherent in these devices.

Mention of "embodiment" in this specification means that a specific feature, structure, or characteristic described with reference to an embodiment may be included in at least one embodiment of this application. This phrase appearing in various locations of this specification does not necessarily mean a same embodiment, or an independent or a candidate embodiment that is exclusive to another embodiment. It may be explicitly or implicitly understood by a person skilled in the art that the embodiment described in this specification may be combined with another embodiment.

It should be understood that, "coupling" in this application may be understood as direct coupling, namely, a direct connection (that is, an electrical connection); or may be understood as indirect coupling, namely, an indirect connection, or a connection by using another component, element, module, apparatus, or the like.

For better understanding of a direct current power supply system, a photovoltaic system, an energy system, and an optical energy system disclosed in embodiments of this application, related technologies are first described below.

An existing direct current switch in the industry finally provides two types of external interfaces regardless of how serial and parallel connections are performed inside the direct current switch. One external interface is: There are a positive terminal and a negative terminal for input, and there are a positive terminal and a negative terminal for output. The other external interface is: There is only a positive terminal (or a negative terminal) for input, and there is a positive terminal (or a negative terminal) for output.

Figure 1:
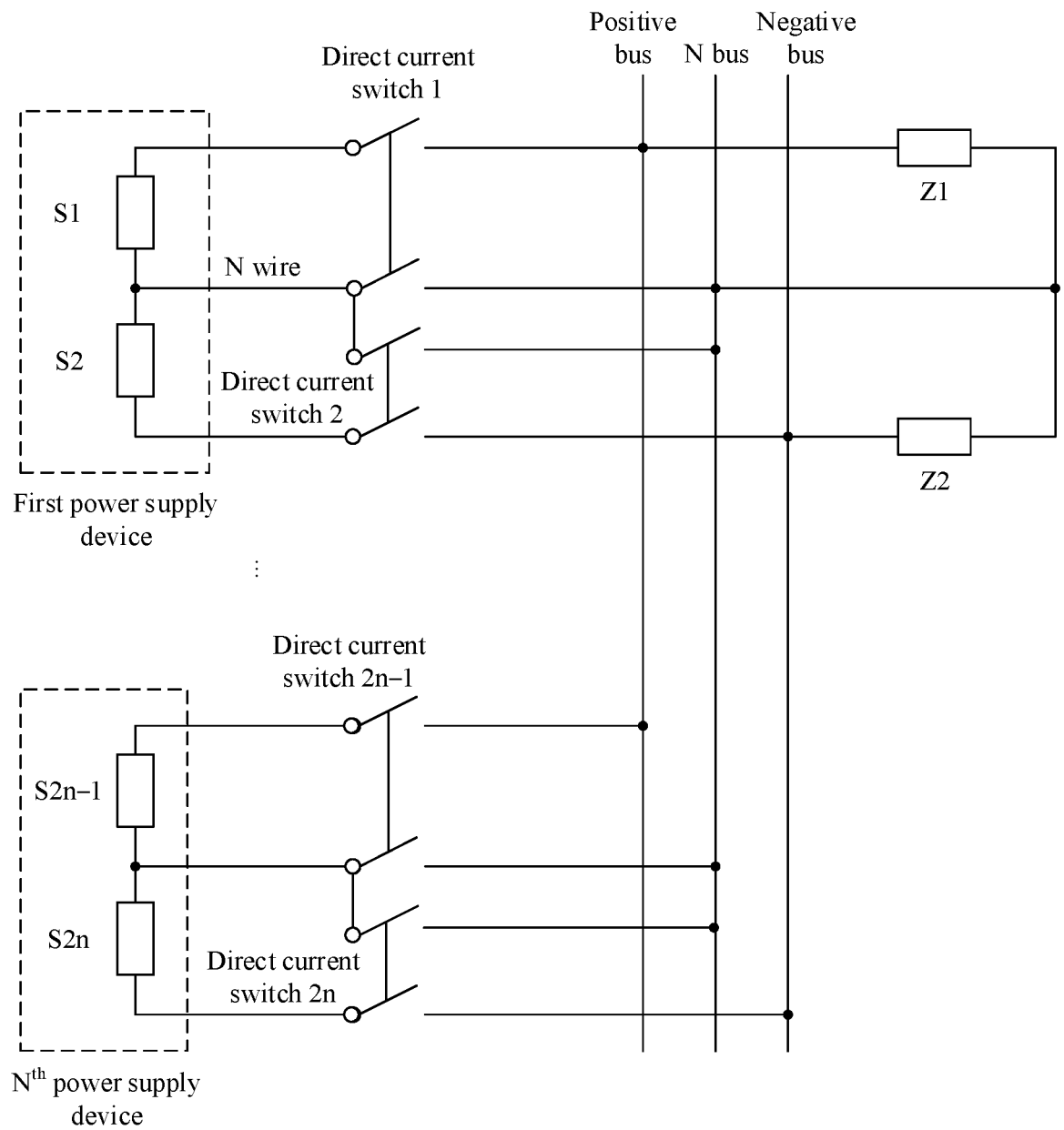
FIG. 1 is a schematic diagram of a structure of a direct current power supply system according to an embodiment of this application.

FIG. 1 is a schematic diagram of a structure of a direct current power supply system according to an embodiment of this application. As shown in FIG. 1, when S1 supplies power to Z1, a current flowing through an N wire flows from a direct current switch 1 to S1; and when S2 supplies power to Z2, a current flowing through the N wire flows from S2 to a direct current switch 2. It can be learned that, in the foregoing two cases, the currents flowing through the N wire are in opposite directions. S1, S2 . . . S2$n$−1, and S2$n$ may be direct current power supplies, or may be power conversion apparatuses. Z1 and Z2 may be loads, or may be power conversion apparatuses.

To protect S1, S2, and a cable, the direct current power supply system shown in FIG. 1 requires two double-pole direct current switches. A volume is large and costs are relatively high if two double-pole direct current switches are used. When a fault (such as a short circuit) occurs between a positive electrode and an N electrode, between the N electrode and a negative electrode, or between the positive electrode and the negative electrode, there is uncertainty for disconnection of the direct current switch 1 and disconnection of the direct current switch 2, and it cannot be ensured that the direct current switch 1 and the direct current switch 2 are disconnected simultaneously. Consequently, protection reliability is reduced.

Figure 2:
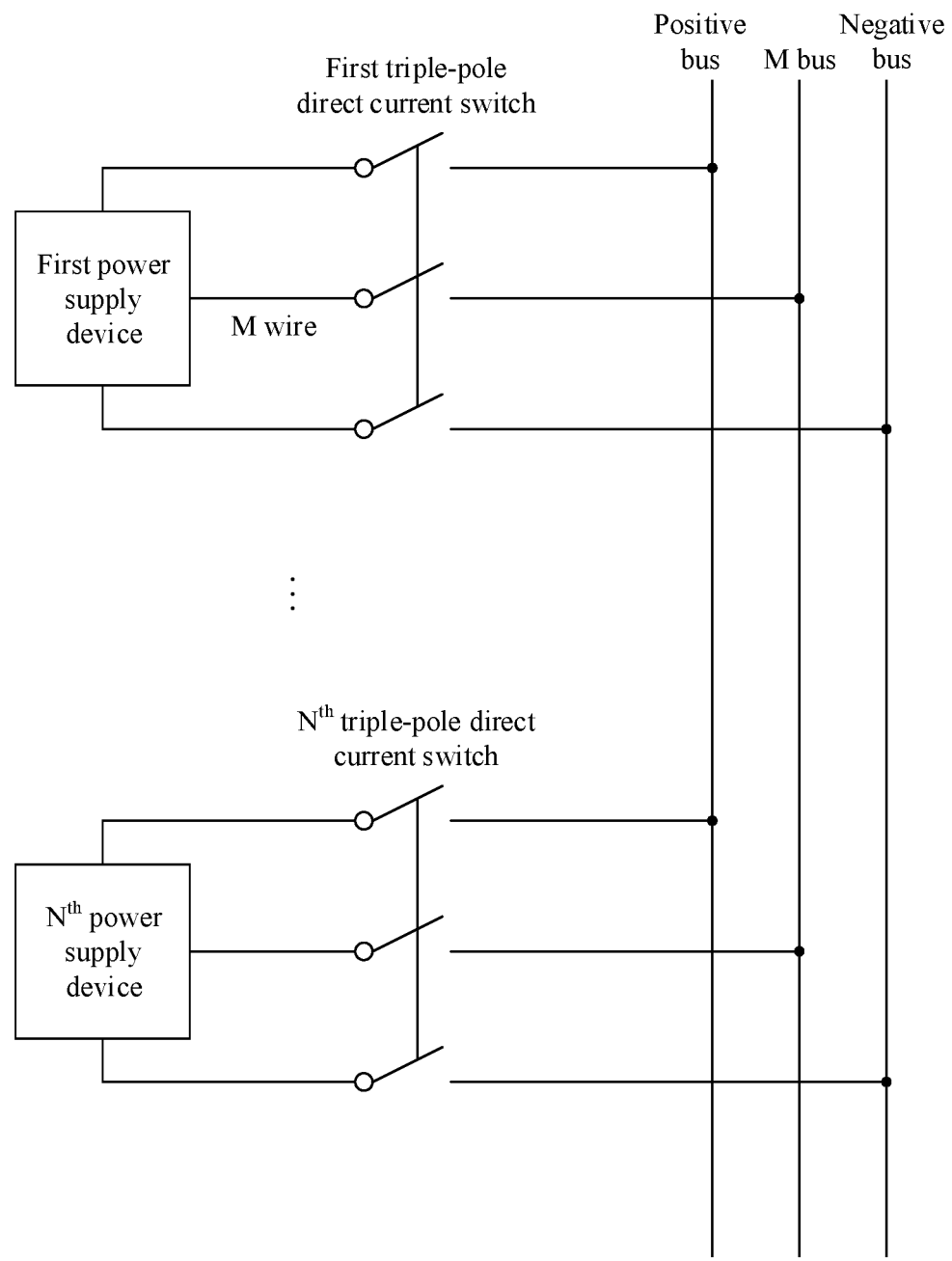
FIG. 2 is a schematic diagram of a structure of another direct current power supply system according to an embodiment of this application.

FIG. 2 is a schematic diagram of a structure of another direct current power supply system according to an embodiment of this application. As shown in FIG. 2, the direct current power supply system may include N power supply devices, N triple-pole direct current switches, a positive bus, an M bus, and a negative bus, where N is an integer greater than or equal to 1.

A positive input terminal of an $i^{th}$ triple-pole direct current switch is coupled to a first output terminal of an $i^{th}$ power supply device, an M input terminal of the $i^{th}$ triple-pole direct current switch is coupled to a second output terminal of the $i^{th}$ power supply device, a negative input terminal of the $i^{th}$ triple-pole direct current switch is coupled to a third output terminal of the $i^{th}$ power supply device, a positive output terminal of the $i^{th}$ triple-pole direct current switch is coupled to the positive bus, an M input terminal of the $i^{th}$ triple-pole direct current switch is coupled to the M bus, and a negative output terminal of the $i^{th}$ triple-pole direct current switch is coupled to the negative bus, where i=1, 2, . . . , N.

The $i^{th}$ power supply device is configured to provide a direct current.

To describe a principle of the direct current power supply system, that i is equal to 1 is used as an example for description. A combination of a positive electrode and an M-electrode of a first triple-pole direct current switch, that is, a circuit in which the positive electrode and the M-electrode of the first triple-pole direct current switch are located, can implement overcurrent protection and isolation for a circuit including a first output terminal and a second output terminal of a first power supply device; a combination of a negative electrode and the M-electrode of the first triple-pole direct current switch can implement overcurrent protection and isolation for a circuit including the second output terminal and a third output terminal of the first power supply device; and a combination of the positive electrode and the negative electrode of the first triple-pole direct current switch can implement overcurrent protection and isolation for a circuit including the first output terminal and the third output terminal of the first power supply device.

Because the three electrodes of the triple-pole direct current switch are connected or disconnected at the same time, when a fault occurs in the circuit including the first output terminal and the second output terminal of the first power supply device, the circuit including the second output terminal and the third output terminal of the first power supply device, or the circuit including the first output terminal and the third output terminal of the first power supply device, the three electrodes of the triple-pole direct current switch can be disconnected at the same time, so that fault protection and isolation can be implemented, and protection and isolation reliability can be improved.

Figure 3:
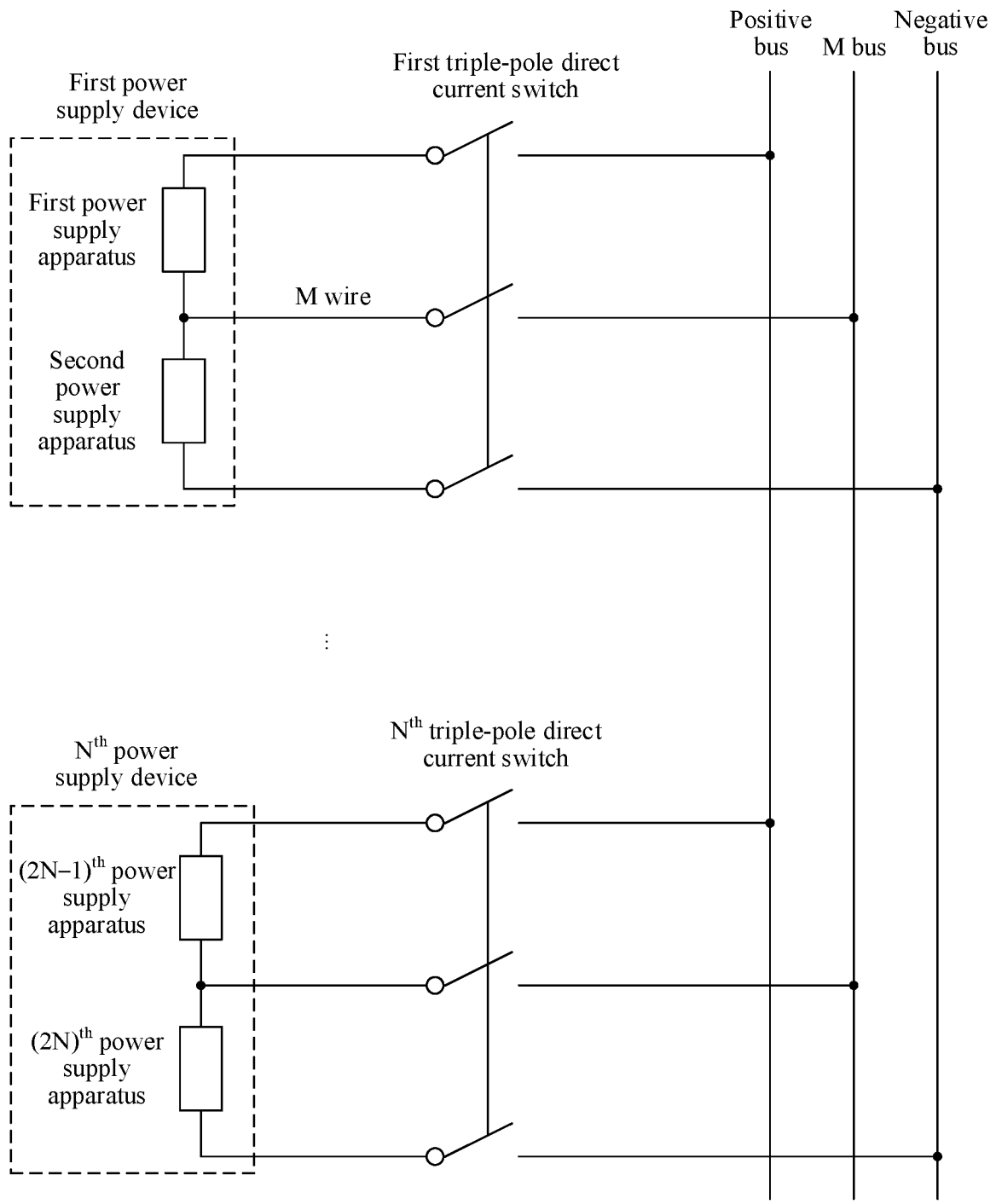
FIG. 3 is a schematic diagram of a structure of still another direct current power supply system according to an embodiment of this application.

FIG. 3 is a schematic diagram of a structure of still another direct current power supply system according to an embodiment of this application. The direct current power supply system shown in FIG. 3 is obtained by optimizing the direct current power supply system shown in FIG. 2.

In an embodiment, the $i^{th}$ power supply device includes a $(2i-1)^{th}$ power supply apparatus and a $(2i)^{th}$ power supply apparatus.

A first output terminal of the $(2i-1)^{th}$ power supply apparatus is coupled to the positive input terminal of the $i^{th}$ triple-pole direct current switch, a second output terminal of the $(2i-1)^{th}$ power supply apparatus is separately coupled to the M input terminal of the $i^{th}$ triple-pole direct current switch and a first output terminal of the $(2i)^{th}$ power supply apparatus, and a second output terminal of the $(2i)^{th}$ power supply apparatus is coupled to the negative input terminal of the $i^{th}$ triple-pole direct current switch.

To describe a principle of the direct current power supply system, that i is equal to 1 is used as an example for description. A combination of a positive electrode and an M-electrode of a first triple-pole direct current switch can implement overcurrent protection and isolation for a circuit including a first power supply apparatus and a circuit of the first power supply apparatus; a combination of a negative electrode and the M-electrode of the first triple-pole direct current switch can implement overcurrent protection and isolation for a second power supply apparatus and a circuit of the second power supply apparatus; and a combination of the positive electrode and the negative electrode of the first triple-pole direct current switch can implement overcurrent protection and isolation for the first power supply apparatus, the second power supply apparatus, and circuits of the first power supply apparatus and the second power supply apparatus. It can be learned that, regardless of whether there is a fault caused by the positive electrode to the M-electrode, a fault caused by the M-electrode to the negative electrode, or a fault caused by the positive electrode to the negative electrode, the positive electrode, the M-electrode, and the negative electrode of the triple-pole direct current switch can be disconnected simultaneously, so that protection and isolation for all faults can be implemented, to improve protection reliability.

In an embodiment, the $(2i-1)^{th}$ power supply apparatus and the $(2i)^{th}$ power supply apparatus are direct current power supplies or power conversion apparatuses.

The power supply apparatus may be a direct current power supply, or may be a power conversion apparatus. The direct current power supply may be a direct current voltage source, or may be a direct current source.

In an embodiment, electric potential of the M bus is between electric potential of the positive bus and electric potential of the negative bus.

In an embodiment, an overcurrent setting value of the M-electrode of the triple-pole direct current switch is less than an overcurrent setting value of the positive electrode of the triple-pole direct current switch and an overcurrent setting value of the negative electrode.

Because the electric potential of the M bus is between the electric potential of the positive bus and the electric potential of the negative bus, when the positive electrode and the M-electrode of the first triple-pole direct current switch are combined, a current flowing through the M-electrode of the first triple-pole direct current switch is supplied by the M bus to the first power supply device; and when the negative electrode and the M-electrode of the first triple-pole direct current switch are combined, a current flowing through the M-electrode of the first triple-pole direct current switch is supplied by the first power supply device to the M bus. It can be learned that the foregoing two currents are in opposite directions. Therefore, the current flowing through the M-electrode of the first triple-pole direct current switch is less than a current flowing through the positive electrode or the negative electrode of the first triple-pole direct current switch.

Because the current flowing through the M-electrode of the first triple-pole direct current switch is less than the current flowing through the positive electrode or the negative electrode of the first triple-pole direct current switch, to implement overcurrent protection and isolation for the power supply device and a cable, the overcurrent setting value of the M-electrode of the triple-pole direct current switch may be less than the overcurrent setting values of the positive electrode and the negative electrode of the triple-pole direct current switch. When the triple-pole direct current switch detects that the current flowing through the M-electrode is greater than or equal to the overcurrent setting value of the M-electrode, the triple-pole direct current switch may be disconnected. When the triple-pole direct current switch detects that the current flowing through the positive electrode is greater than or equal to the overcurrent setting value of the positive electrode, the triple-pole direct current switch may be disconnected. When the triple-pole direct current switch detects that the current flowing through the negative electrode is greater than or equal to the overcurrent setting value of the negative electrode, the triple-pole direct current switch may be disconnected. It can be learned that the triple-pole direct current switch may implement overcurrent protection and isolation for the power supply device and the cable by using the overcurrent setting values of the positive electrode, the M-electrode, and the negative electrode.

Because the overcurrent setting value of the M-electrode of the triple-pole direct current switch is less than the overcurrent setting value of the positive electrode of the triple-pole direct current switch and the overcurrent setting value of the negative electrode, a cable corresponding to the M-electrode of the triple-pole direct current switch may be smaller than a cable corresponding to the positive electrode or the negative electrode, so that costs can be reduced. For example, when the overcurrent setting value of the M-electrode is only approximately 20% of the overcurrent setting value of the positive electrode or the negative electrode, a through-current capability of the cable corresponding to the M-electrode may be only approximately 20% of that of a cable corresponding to the positive electrode or the negative electrode.

Figure 4:
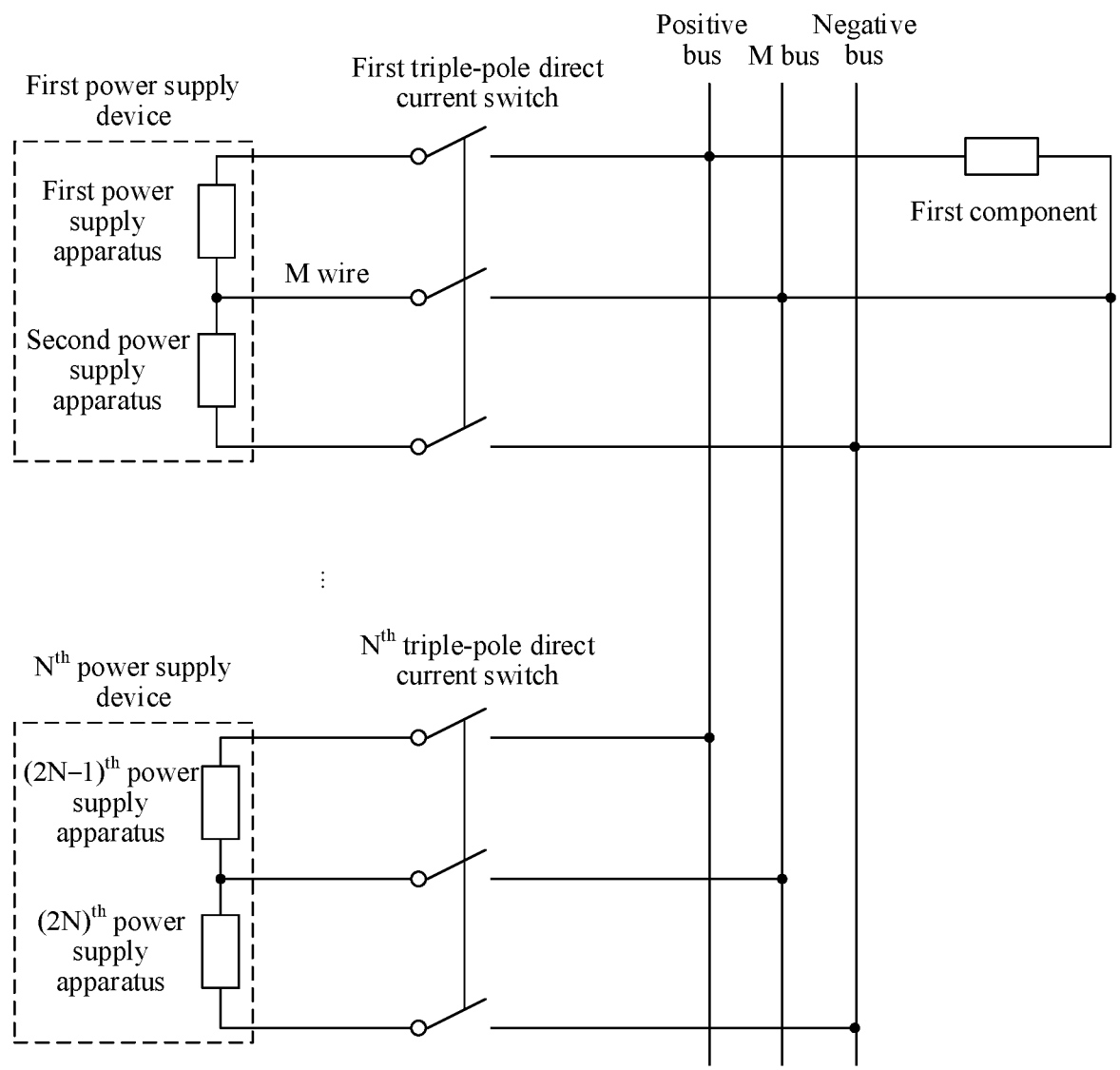
FIG. 4 is a schematic diagram of a structure of still another direct current power supply system according to an embodiment of this application.

FIG. 4 is a schematic diagram of a structure of still another direct current power supply system according to an embodiment of this application. The direct current power supply system shown in FIG. 4 is obtained by optimizing the direct current power supply system shown in FIG. 3.

In an embodiment, the direct current power supply system may further include a first component.

One end of the first component is coupled to the positive bus, and the other end of the first component is separately coupled to the M bus and the negative bus.

Figure 5:
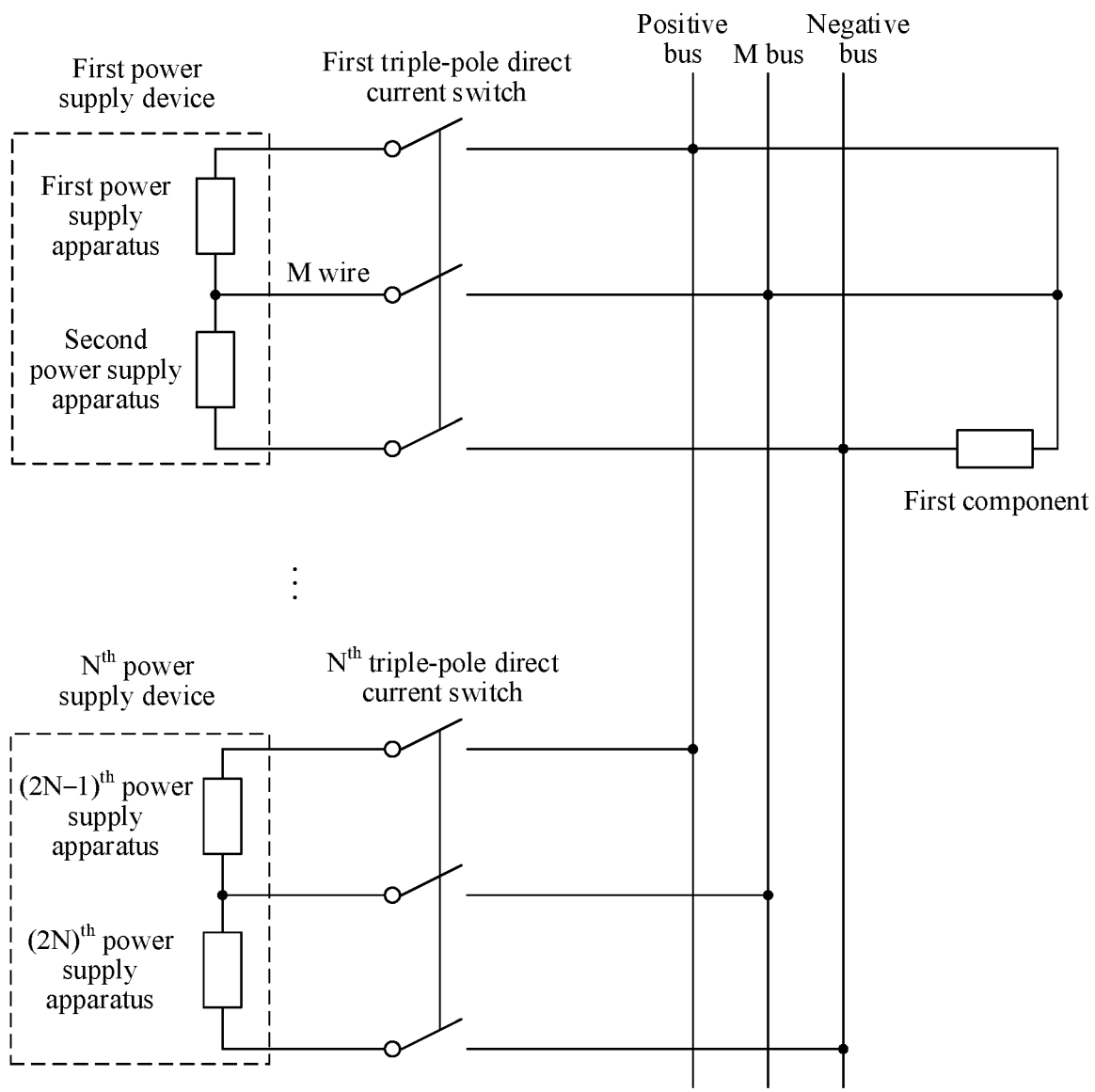
FIG. 5 is a schematic diagram of a structure of still another direct current power supply system according to an embodiment of this application.

FIG. 5 is a schematic diagram of a structure of still another direct current power supply system according to an embodiment of this application. The direct current power supply system shown in FIG. 5 is obtained by optimizing the direct current power supply system shown in FIG. 3.

In an embodiment, the direct current power supply system may further include a first component.

One end of the first component is coupled to the negative bus, and the other end of the first component is separately coupled to the M bus and the positive bus.

Figure 6:
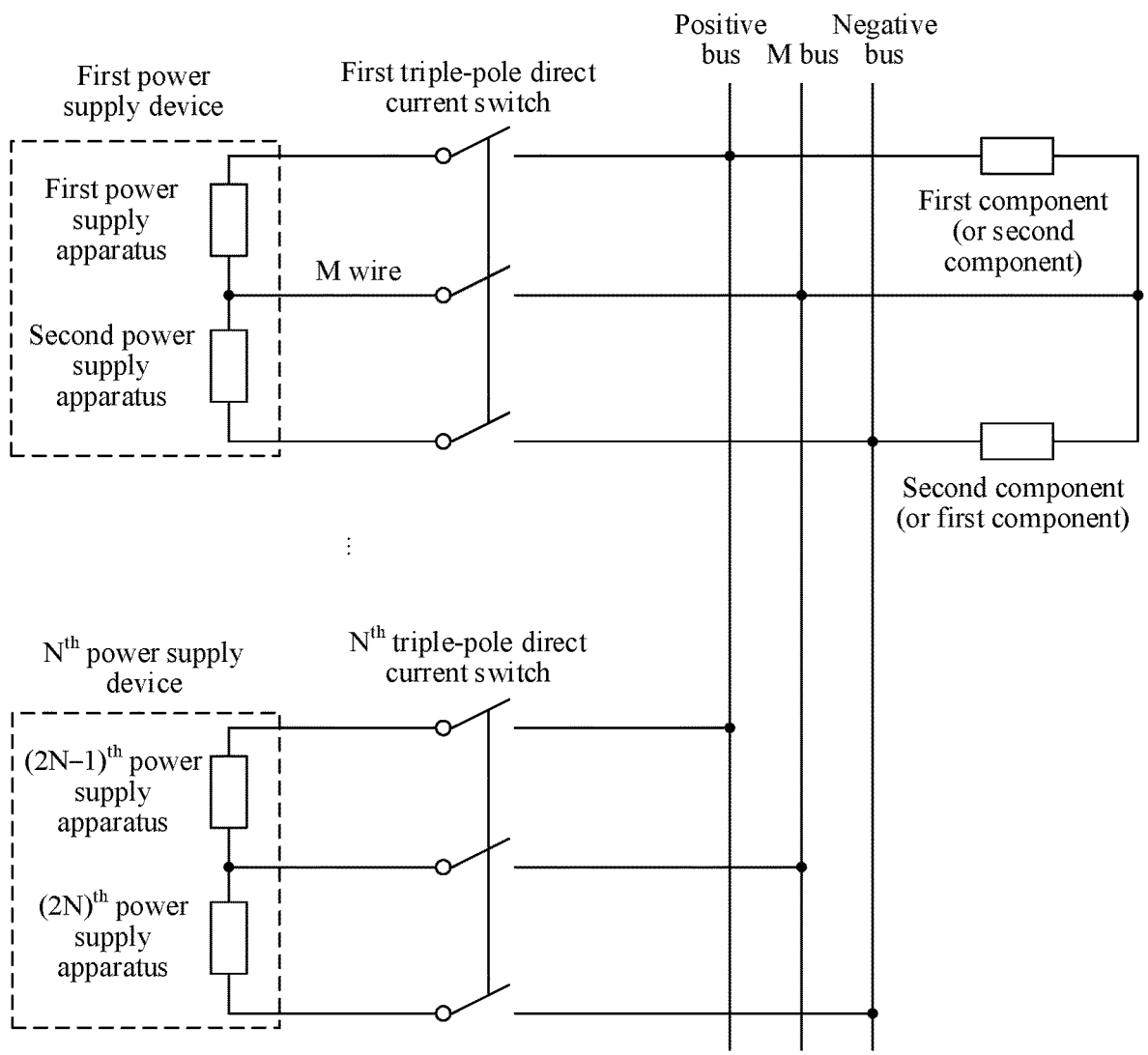
FIG. 6 is a schematic diagram of a structure of still another direct current power supply system according to an embodiment of this application.

FIG. 6 is a schematic diagram of a structure of still another direct current power supply system according to an embodiment of this application. The direct current power supply system shown in FIG. 6 is obtained by optimizing the direct current power supply system shown in FIG. 4 or FIG. 5.

In an embodiment, the direct current power supply system may further include a second component.

One end of the second component is coupled to the negative bus, and the other end of the second component is separately coupled to the M bus and the other end of the first component; or one end of the second component is coupled to the positive bus, and the other end of the second component is separately coupled to the M bus and the other end of the first component.

In an embodiment, the first component and the second component may be loads, may be power conversion apparatuses, or may be storage apparatuses.

It should be understood that, in addition to the first component and the second component, the direct current power supply system may further include a third component and the like. It can be learned that the direct current power supply system may include no component, may include one component, may include two components, or may include three or more components.

It should be understood that the power conversion apparatus may be a direct current-direct current converter.

Figure 7:
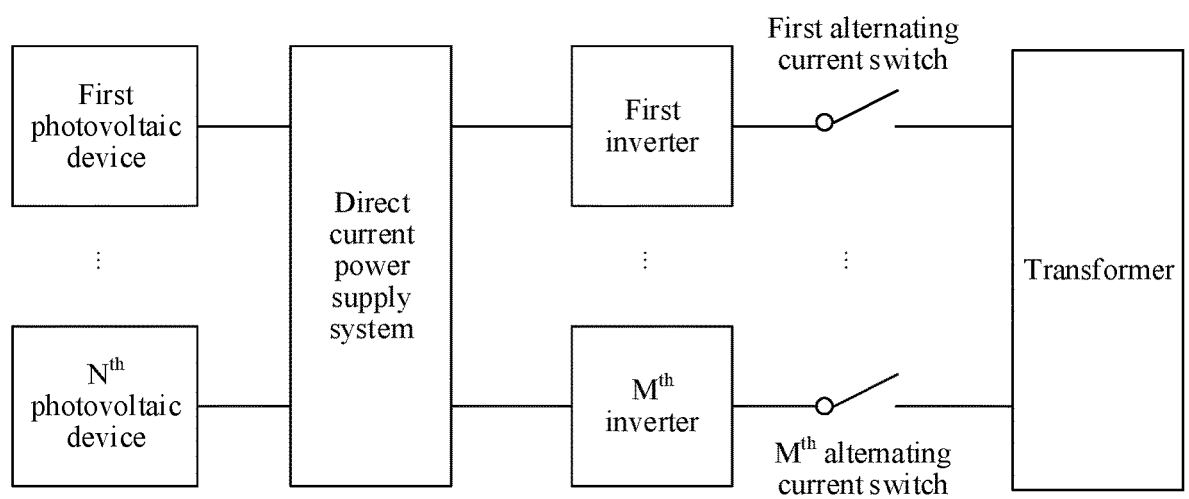
FIG. 7 is a schematic diagram of a structure of a photovoltaic system according to an embodiment of this application.

The direct current power supply system may be applied to a photovoltaic system. FIG. 7 is a schematic diagram of a structure of a photovoltaic system according to an embodiment of this application. As shown in FIG. 7, the photovoltaic system may include N photovoltaic devices, M inverters, a transformer, and a direct current power supply system, where M is an integer greater than or equal to 1.

The N photovoltaic devices are separately coupled to the direct current power supply system, and the M inverters are separately coupled to the direct current power supply system and the transformer.

The photovoltaic device is configured to provide a first direct current for the direct current power supply system.

The direct current power supply system is configured to convert the first direct current into a second direct current.

The inverter is configured to convert the second direct current into a first alternating current.

The transformer is configured to convert the first alternating current into a second alternating current.

A structure of the direct current power supply system may be shown in any one of FIG. 2 to FIG. 5.

In an embodiment, the photovoltaic system may further include M alternating current switches.

Two terminals of a $j^{th}$ alternating current switch are separately coupled to a $j^{th}$ inverter and the transformer, where j=1, 2 . . . M.

In an embodiment, an $i^{th}$ photovoltaic device may include one or more photovoltaic strings.

The one or more photovoltaic strings are separately coupled to an $i^{th}$ power supply device in the direct current power supply system.

Figure 8:
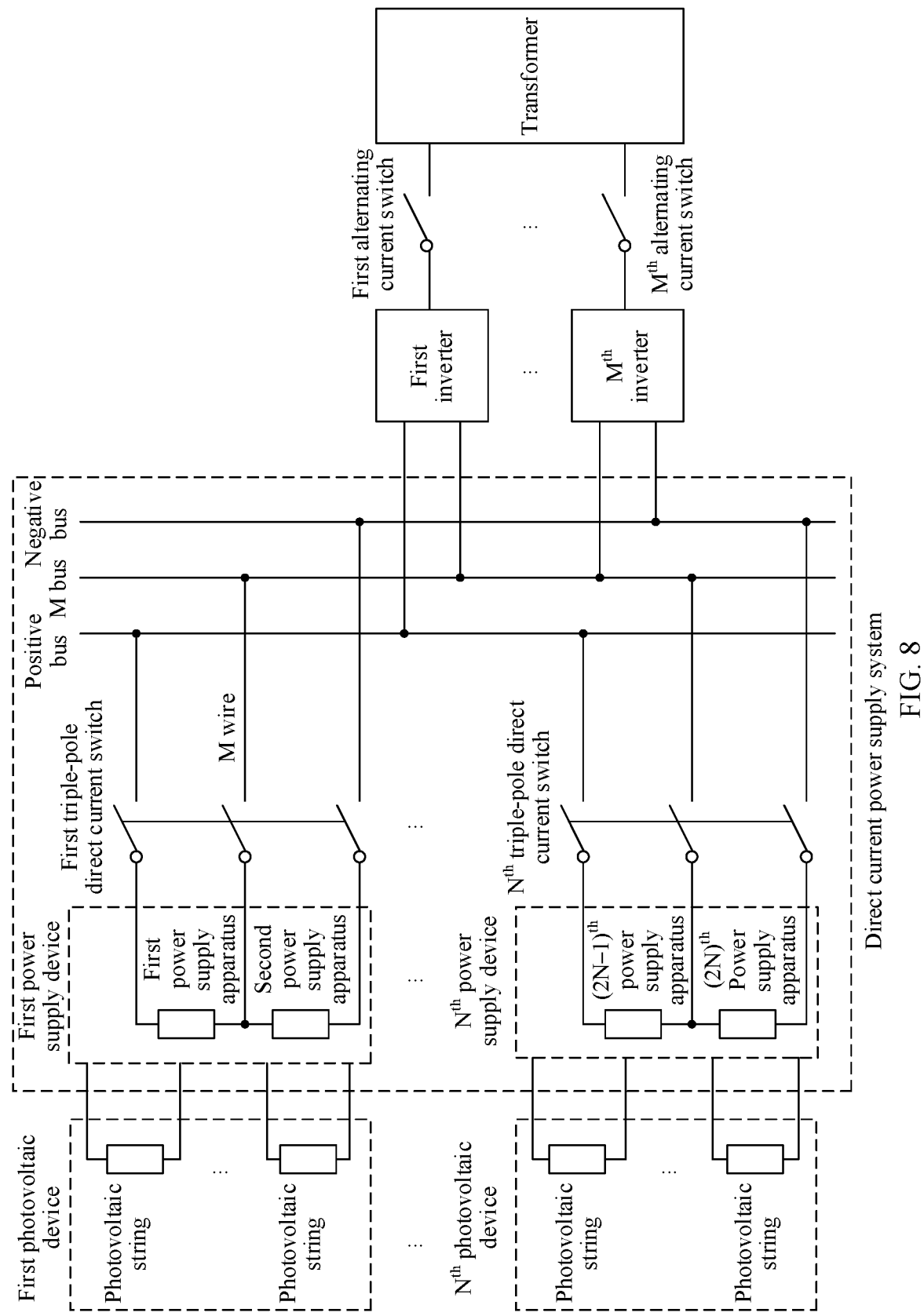
FIG. 8 is a schematic diagram of a structure of another photovoltaic system according to an embodiment of this application.

FIG. 8 is a schematic diagram of a structure of another photovoltaic system according to an embodiment of this application. As shown in FIG. 8, a structure of a direct current power supply system may be shown in FIG. 2 or FIG. 3.

Figure 9:
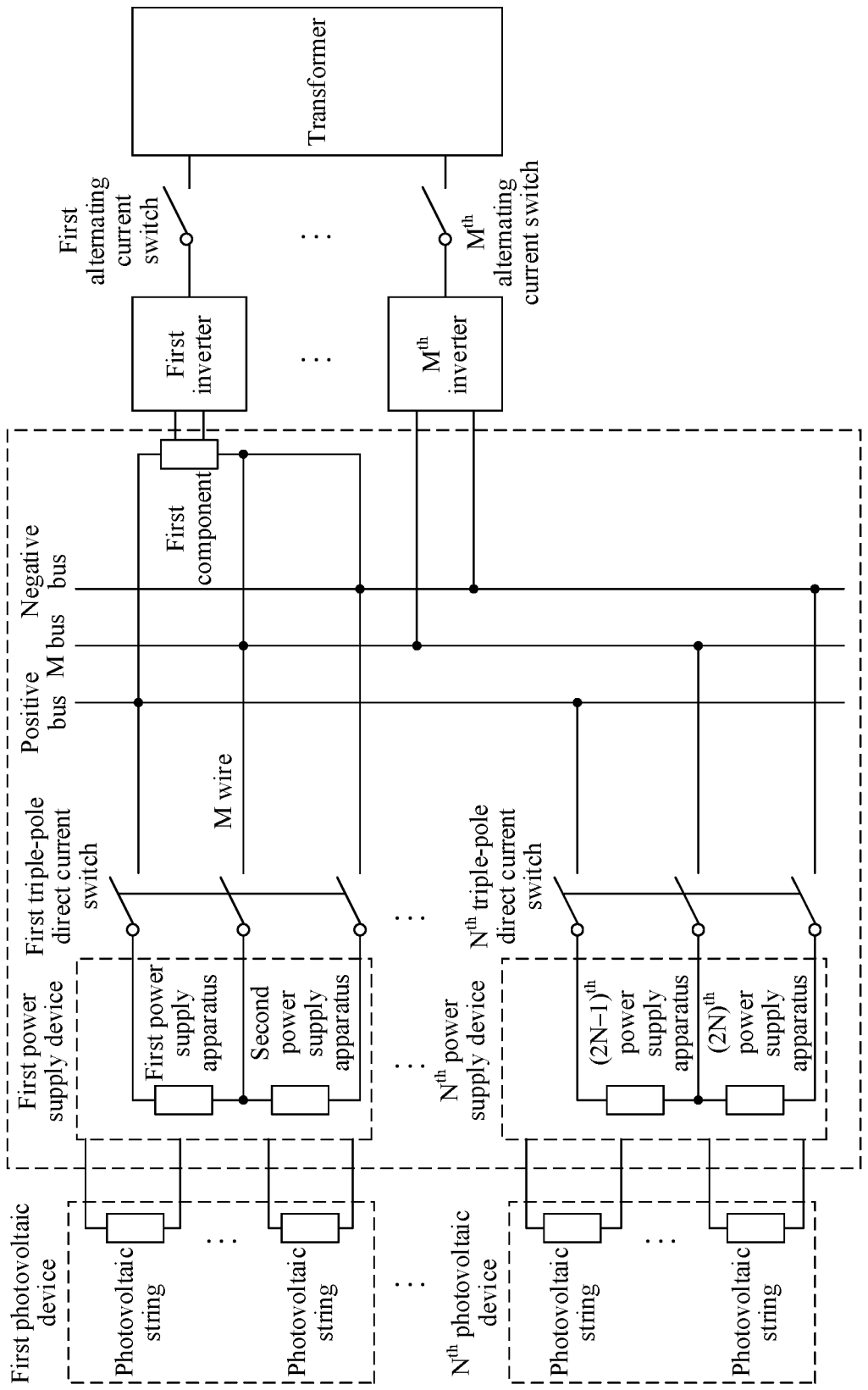
FIG. 9 is a schematic diagram of a structure of still another photovoltaic system according to an embodiment of this application.

FIG. 9 is a schematic diagram of a structure of still another photovoltaic system according to an embodiment of this application. As shown in FIG. 9, a structure of a direct current power supply system may be shown in FIG. 4.

Photovoltaic systems corresponding to the direct current power supply systems shown in FIG. 5 and FIG. 6 are similar to FIG. 8.

It can be learned that two ends of an inverter may be separately coupled to a positive bus and an M bus in the direct current power supply system, may be separately coupled to an M bus and a negative bus in the direct current power supply system, or may be separately coupled to a component (such as a first component or a second component) in the direct current power supply system.

In addition, the direct current power supply system may further be applied to an energy storage system. For a structure of the energy storage system, refer to a structure of the photovoltaic system. In this case, the photovoltaic devices in FIG. 8 and FIG. 9 may be replaced with battery devices, and the photovoltaic strings in FIG. 7 and FIG. 8 may be replaced with battery packs. Others are similar to those in FIG. 8 and FIG. 9.

In addition, the direct current power supply system may further be applied to an optical storage system. For a structure of the optical storage system, refer to a structure of the photovoltaic system. The optical storage system may include a photovoltaic system and a storage system. The optical storage system may include P photovoltaic devices and Q battery devices, where P+Q is equal to N, and both P and Q are integers greater than or equal to 1. In other words, some photovoltaic devices in FIG. 8 and FIG. 9 may be replaced with battery devices, and some photovoltaic strings in FIG. 8 and FIG. 9 may be replaced with battery packs. Others are similar to those in FIG. 8 and FIG. 9.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement, or improvement made based on technical solutions of this application shall fall within the protection scope of this application.

What is claimed is:

1. A direct current power supply system, comprising:
   N power supply devices, wherein N is an integer greater than or equal to 1;
   N triple-pole direct current switches;
   a positive bus;
   an M bus;
   a negative bus;
   a positive input terminal of an $i^{th}$ triple-pole direct current switch is coupled to a first output terminal of an $i^{th}$ power supply device, an M input terminal of the $i^{th}$ triple-pole direct current switch is coupled to a second output terminal of the $i^{th}$ power supply device, a negative input terminal of the $i^{th}$ triple-pole direct current switch is coupled to a third output terminal of the $i^{th}$ power supply device, a positive output terminal of the $i^{th}$ triple-pole direct current switch is coupled to the positive bus, an M input terminal of the $i^{th}$ triple-pole direct current switch is coupled to the M bus, and a negative output terminal of the $i^{th}$ triple-pole direct current switch is coupled to the negative bus, wherein i is an integer greater than or equal to 1; and
   the $i^{th}$ power supply device is configured to provide a direct current.

2. The system according to claim 1, wherein:
   the $i^{th}$ power supply device comprises a $(2i-1)^{th}$ power supply apparatus and a $(2i)^{th}$ power supply apparatus; and
   a first output terminal of the $(2i-1)^{th}$ power supply apparatus is coupled to the positive input terminal of the $i^{th}$ triple-pole direct current switch, a second output terminal of the $(2i-1)^{th}$ power supply apparatus is separately coupled to the M input terminal of the $i^{th}$ triple-pole direct current switch and a first output terminal of the $(2i)^{th}$ power supply apparatus, and a second output terminal of the $(2i)^{th}$ power supply apparatus is coupled to the negative input terminal of the $i^{th}$ triple-pole direct current switch.

3. The system according to claim 2, wherein the $(2i-1)^{th}$ power supply apparatus and the $(2i)^{th}$ power supply apparatus are direct current power supplies or power conversion apparatuses.

4. The system according to claim 1, wherein the system further comprises:
   a first component, wherein one end of the first component is coupled to the positive bus and the other end of the first component is separately coupled to the M bus and the negative bus.

5. The system according to claim 4, wherein the system further comprises:
   a second component, wherein one end of the second component is coupled to the negative bus and the other end of the second component is separately coupled to the M bus and the other end of the first component.

6. The system according to claim 5, wherein the first component and the second component are loads, power conversion apparatuses, or storage apparatuses.

7. The system according to claim 1, wherein the system further comprises:

a first component, wherein one end of the first component is coupled to the negative bus and the other end of the first component is separately coupled to the M bus and the positive bus.

8. The system according to claim 7, wherein the system further comprises:
a second component, wherein one end of the second component is coupled to the positive bus and the other end of the second component is separately coupled to the M bus and the other end of the first component.

9. The system according to claim 8, wherein the first component and the second component are loads, power conversion apparatuses, or storage apparatuses.

10. The system according to claim 1, wherein electric potential of the M bus is between an electric potential of the positive bus and an electric potential of the negative bus.

11. The system according to claim 1, wherein an overcurrent setting value of an M electrode of each of the N triple-pole direct current switches is less than an overcurrent setting value of a positive electrode of the triple-pole direct current switch and an overcurrent setting value of a negative electrode.

12. A photovoltaic system, comprising:
N photovoltaic devices, wherein the N photovoltaic devices are separately coupled to a direct current power supply system, and M inverters are separately coupled to the direct current power supply system and a transformer;
M inverters;
a transformer; and
the direct current power supply system according to claim 1, wherein M is an integer greater than or equal to 1,
wherein an Nth photovoltaic device is configured to provide a first direct current for the direct current power supply system,
wherein the direct current power supply system is configured to convert the first direct current into a second direct current,
wherein an inverter is configured to convert the second direct current into a first alternating current, and
wherein the transformer is configured to convert the first alternating current into a second alternating current.

13. The photovoltaic system according to claim 12, wherein:
the photovoltaic system further comprises M alternating current switches, and two terminals of a $j^{th}$ alternating current switch are separately coupled to a $j^{th}$ inverter and the transformer, wherein j is an integer greater than or equal to 1.

14. The photovoltaic system according to claim 12, wherein:
the $i^{th}$ photovoltaic device comprises one or more photovoltaic strings; and
the one or more photovoltaic strings are separately coupled to an $i^{th}$ power supply device in the direct current power supply system.

15. An energy storage system, comprising at least the direct current power supply system according to claim 1.

16. An optical storage system, comprising at least the direct current power supply system according to claim 1.

* * * * *